United States Patent [19]

Prete et al.

[11] Patent Number: 5,445,266
[45] Date of Patent: Aug. 29, 1995

[54] CARRYING CASE AND VARIABLE-ANGLE SUPPORT STAND FOR PORTABLE COMPUTER

[76] Inventors: Richard Prete, 3 University Pl., Lake Success, N.Y. 11020; Pablo V. Vialera, 5404 W. 22 Ct., Hialeah, Fla. 33016

[21] Appl. No.: 153,679

[22] Filed: Nov. 16, 1993

[51] Int. Cl.⁶ .................... A45C 11/00; A45C 13/00
[52] U.S. Cl. .................... 206/320; 206/305; 190/102; 190/900
[58] Field of Search ............ 206/320, 305; 190/102, 190/900

[56] References Cited

U.S. PATENT DOCUMENTS

| | | | |
|---|---|---|---|
| 2,200,404 | 5/1940 | Vogt | 206/45.23 |
| 2,327,301 | 8/1943 | Davis | 206/45.23 |
| 2,616,558 | 11/1952 | Kay, Jr. | 206/45.13 |
| 4,044,980 | 8/1977 | Cummins | 248/459 X |
| 4,259,568 | 3/1981 | Dynesen | 206/305 X |
| 4,280,034 | 7/1981 | Ezaki et al. | 235/1 D |
| 4,420,270 | 12/1983 | Rossello | 190/900 X |
| 4,564,091 | 1/1986 | Coneglio | 190/900 X |
| 4,896,776 | 1/1990 | Kabanuk et al. | 206/305 X |
| 4,991,817 | 2/1991 | VonKleist et al. | 248/676 |
| 5,010,988 | 4/1991 | Brown | 206/320 |
| 5,105,338 | 4/1992 | Held | 206/305 X |
| 5,115,893 | 5/1992 | Terkildsen | 190/900 |
| 5,177,665 | 1/1993 | Frank et al. | 206/305 X |
| 5,214,574 | 5/1993 | Chang | 206/320 X |
| 5,217,119 | 6/1993 | Hollingsworth | 206/320 X |
| 5,267,123 | 11/1993 | Boothroyd et al. | 206/305 X |
| 5,325,970 | 7/1994 | Dillon et al. | 206/320 X |

*Primary Examiner*—William I. Price
*Attorney, Agent, or Firm*—Hoffmann & Baron

[57] ABSTRACT

A carry case for a pen-based computer. The case is of a design which minimizes its footprint, yet provides a variable tilt support structure for the computer. Accordingly, the computer can be positioned at the optimum viewing angle of the user during non hand-held use, even under crowded working conditions. The case allows the computer to be readily removed therefrom for hand-held use.

25 Claims, 5 Drawing Sheets

CARRYING CASE AND VARIABLE-ANGLE SUPPORT STAND FOR PORTABLE COMPUTER

BACKGROUND OF THE INVENTION

The present invention relates to a carrying case for a portable computer and, more particularly, to a carrying case which provides a variable-angle support stand for a portable computer during non hand-held use.

It is well-known that portable computers and, in particular, pen-based portable computers, are becoming more and more common. These computers are typically used by individuals who work in the field, e.g., salesman, technicians, service consultants, etc. Further, these computers are typically designed for both hand-held use (where information is entered through a light pen, touch screen, key pad or similar means) and non hand-held use (where the computer is placed on a support stand and information is entered through a keyboard, disc drive etc.).

Accordingly, those individuals who employ portable computers in the field must be able to safely transport the computer between working locations, quickly and readily access the computer for hand-held use and quickly and readily set-up the computer for entry of information through, for example, the keyboard. This set-up should be easily accomplished, even under crowded working conditions. Ideally, the carrying case in which the computer is transported addresses these needs.

The prior art, however, has failed to provide a carrying case which can perform these many functions. The typical prior art carrying case is used only to transport and store the computer during non-use. In other words, the computer is removed from the case for hand-held use (which sometimes involves a time-consuming operation) and then, with respect to non hand-held use, must be set-up on a separate stand which is carried in addition to the computer and case.

The ideal carrying case would provide a design in which the computer is readily removed from the case for hand-held use and which provides a support structure for the computer during non hand-held use. This support structure would be capable of being rapidly assembled and disassembled. This ideal carrying case would also provide a design in which the footprint of the case is minimized. As will be appreciated by those who employ portable computers in the field, the work space available for set-up and non hand-held use of a portable computer is typically quite small. Particularly, a user, e.g., a salesman visiting the business of a client, may have only the corner of a desk on which to work. A carrying case and/or support stand requiring a large amount of work space is simply impractical.

SUMMARY OF THE INVENTION

The present invention, which addresses the needs of the prior art, provides a carrying case for a portable computer. This carrying case provides ready access to the computer to allow hand-held use and also provides a variable angle support stand for the computer during non hand-held use. The case includes front, back and bottom portions. The bottom portion extends between and interconnects the front and back portions. These portions are articulable with respect to each other between a closed condition and open condition. The case further includes first securing means positioned on one of the portions to releasably secure a first edge of a triangular support plane when the case is in the open position. Finally, the case includes second securing means positioned on another of the portions to releasably secure a second edge of the support plane whereby the support plane and the case form a triangular support structure.

In a preferred embodiment of the present invention, the support plane is a substantially rigid shelf movable between a stored position and a working position. Preferably, the shelf includes a telescoping leg whereby the length of the shelf may be varied. In another embodiment, the support plane is the computer itself.

As a result of the present invention, a carrying case is provided which allows ready access to the computer contained therein. Particularly, the computer may be easily removed from the case for hand-held use. Further, this case provides a variable angle support structure for the computer during non hand-held use. The design of the present invention allows this support structure to be both easily assembled and disassembled. Further, the design of the present invention, when employed as a support structure, encompasses a minimal footprint, thereby allowing use of such structure under crowded working conditions.

DETAILED DESCRIPTION OF THE INVENTION

Figure 1:
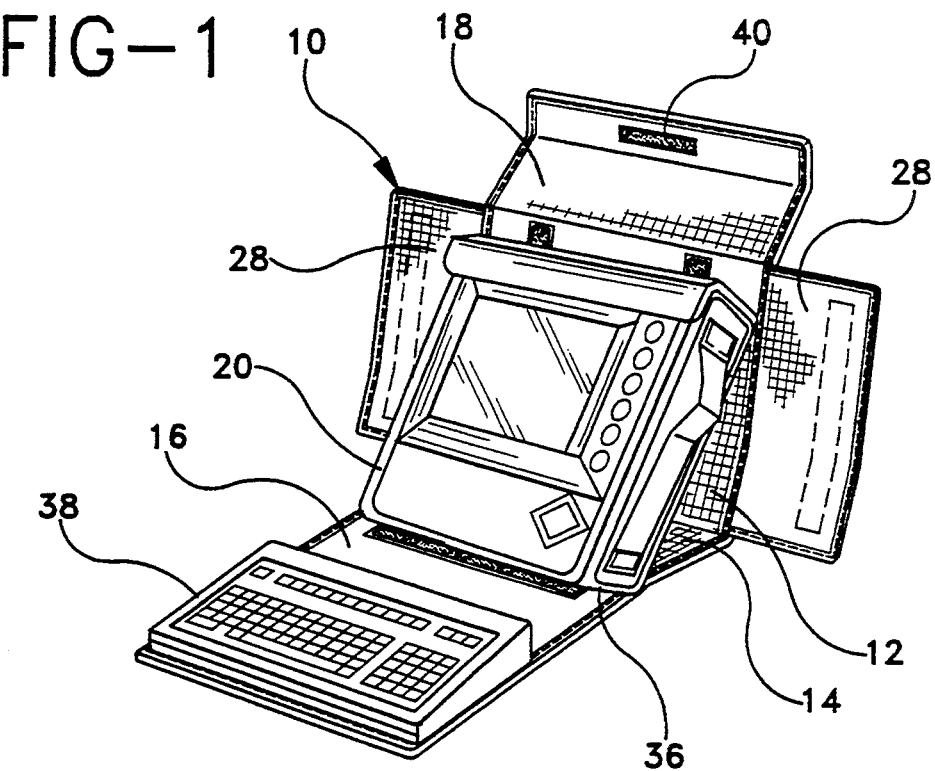
FIG. 1 is a perspective view of the present invention in its open position supporting a computer for viewing.
Figure 2:
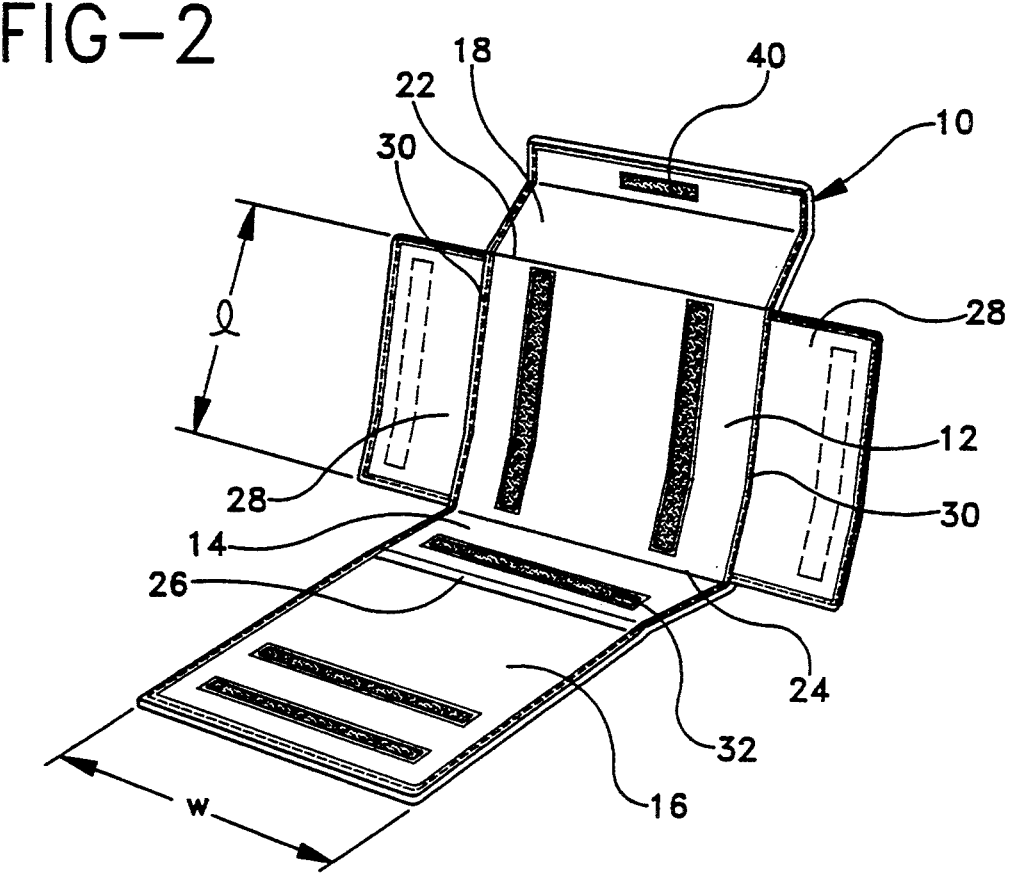
FIG. 2 is a perspective view of the present invention in its open position with the computer removed for hand-held use.

Referring to FIGS. 1 and 2 of the drawings, a carrying case 10 formed in accordance with the present invention is shown. Case 10 includes back 12, bottom 14, front 16 and top 18. The case is designed and configured to support a computer 20 at a viewing angle comfortable to the user.

As shown, top 18 is hingedly attached to back 12 along edge 22. In turn, back 12 is hingedly attached to bottom 14 along edge 24, while bottom 14 is hingedly attached to front 16 along edge 26.

Preferably, case 10 includes a pair of sides 28. In the embodiment shown in FIGS. 1 and 2, these sides are hingedly attached to the back along edges 30. Alternatively, sides 28 may be attached to front 16, or even to bottom 14.

In one preferred embodiment, case 10 includes a fastening strip 32 extending across the width w of bottom 14 and a pair of fastening strips 34 extending along the length 1 of back 12. These strips are preferably engagable strips of hook and loop fasteners (e.g., VELCRO). Particularly one strip (e.g., the hooks) is secured to the case while the mating strip (i.e., the loops) is secured to the computer.

Accordingly, lower edge 36 of computer 20 may be provided along its width with a strip of loop fasteners. This strip of loop fasteners may then be engaged with fastening strip 32, which in this case would include a strip of hook fasteners. In this manner, lower edge 36 of the computer may be secured to the case.

Once lower edge 36 is secured to the case, the user may angle the computer until the optimum viewing angle is achieved. While maintaining the computer at this angle, the user engages the fastening strip located on the upper, back portion of the computer with fastening strips 34, thereby supporting the computer at the optimum viewing angle. This engagement is accomplished by holding the computer in a stationary position and rotating back 12 about edge 24 until fastening strips 34 engage the fastening strip on the upper, back portion of the computer.

Because fastening strips 34 extend along the length 1 of back 12, an infinite number of viewing angles are obtainable. Particularly, once the lower edge of the computer is secured by fastening strip 32, the computer may be angled anywhere from a substantially horizontal position to a substantially vertical position. Preferably, the computer is oriented at an angle that facilitates viewing while operating keyboard 38.

Figure 3:
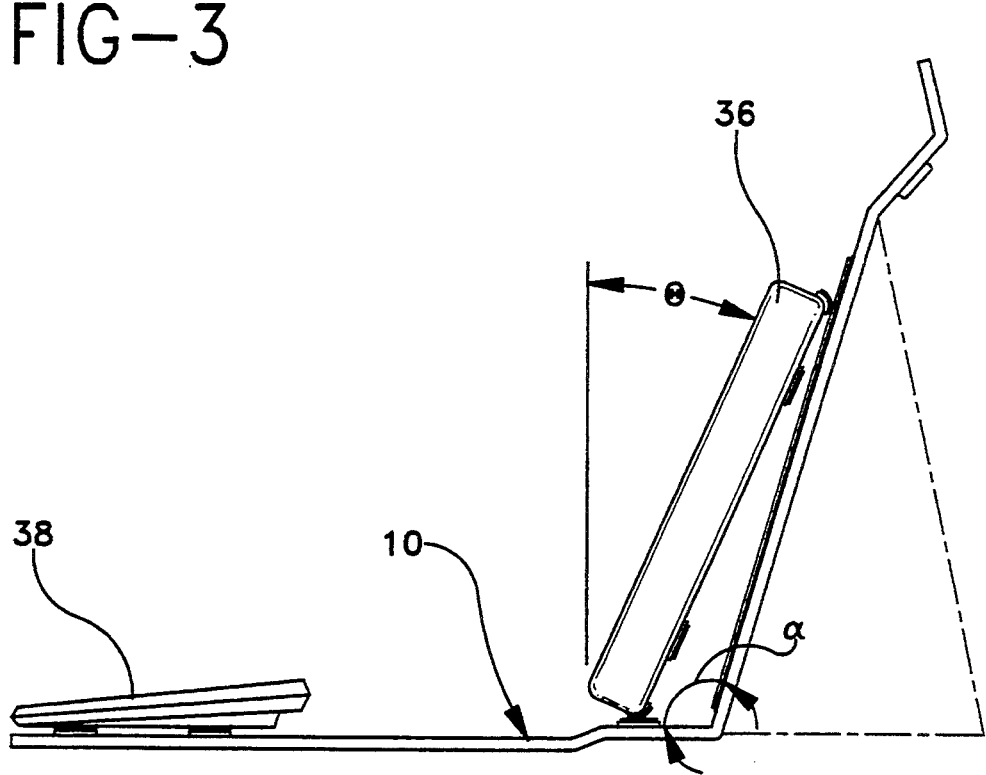
FIG. 3 is a side view of the present invention depicting the computer supported for viewing.

Referring to FIG. 3, it can be seen that the computer and case cooperate together to form a triangular support structure. As mentioned, viewing angle $\theta$ of the computer may be infinitely adjusted from a substantially vertical orientation (where $\theta \approx 0$) to a substantially horizontal orientation (where $\theta \approx 90$). Because back portion 12 is hingedly attached to bottom position 14, angle $\alpha$ may move through approximately 90° of rotation.

One significant advantage of the present invention concerns the case's reduced footprint. Specifically, because the present invention relies on the computer itself to complete the triangular support structure, it is not necessary to provide the case with additional external support members, such as those depicted in phantom in FIG. 3. In other words, the footprint and required work space of case 10 can be reduced by an amount equal to the volume defined by the support members shown in phantom. In environments where portable computers are commonly employed, this reduced space requirement is an important consideration. As mentioned, salesmen who call on a client may have only the corner of a desk on which to work. The design of the present invention minimizes the amount of space required to effectively operate the computer, thereby maximizing the efficiency and ease at which a user may employ the case in a crowded working environment.

Figure 4:
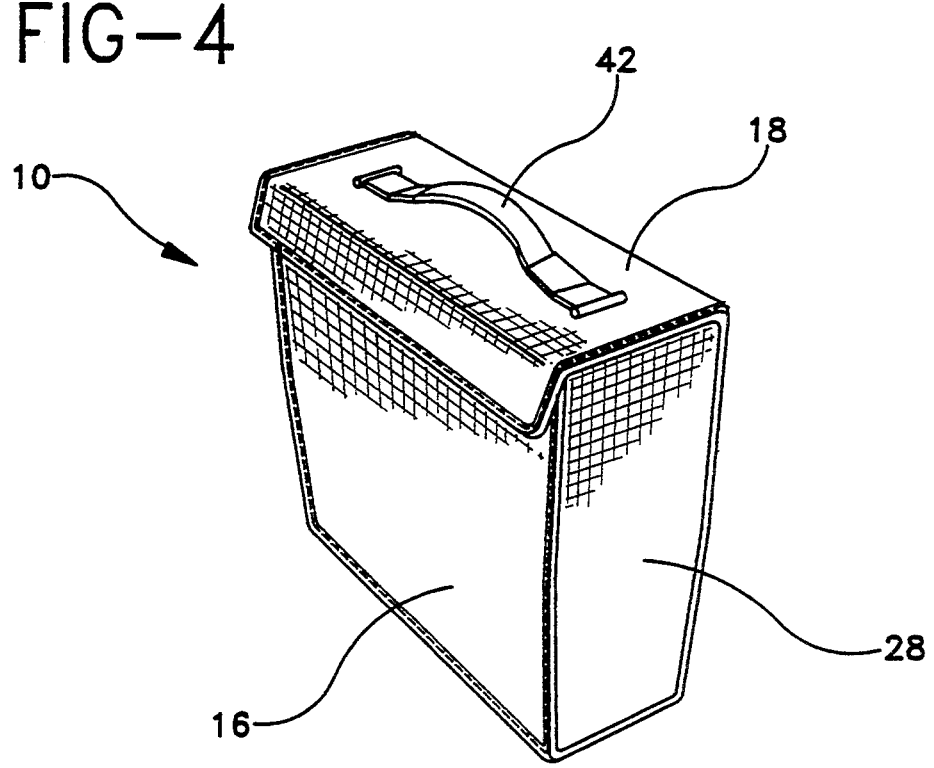
FIG. 4 is a perspective view of the present invention in a closed position.

When the computer is not in use, sides 28 are folded inward, front 16 is folded upward and top 18 is folded downward, as shown in FIG. 4. Top 18 and sides 28 may include fastening strips 40 for maintaining the case in the closed position. Further, case 10 may include a handle 42 attached to top 18.

Prior to closing of the case, lower edge 36 of computer 20 is preferably removed from fastening strip 32 so that the computer can be placed flat against back 12. The same strips employed to secure the computer in an angled position during use may also be employed to secure the computer to the back portion during non-use.

Figure 5:
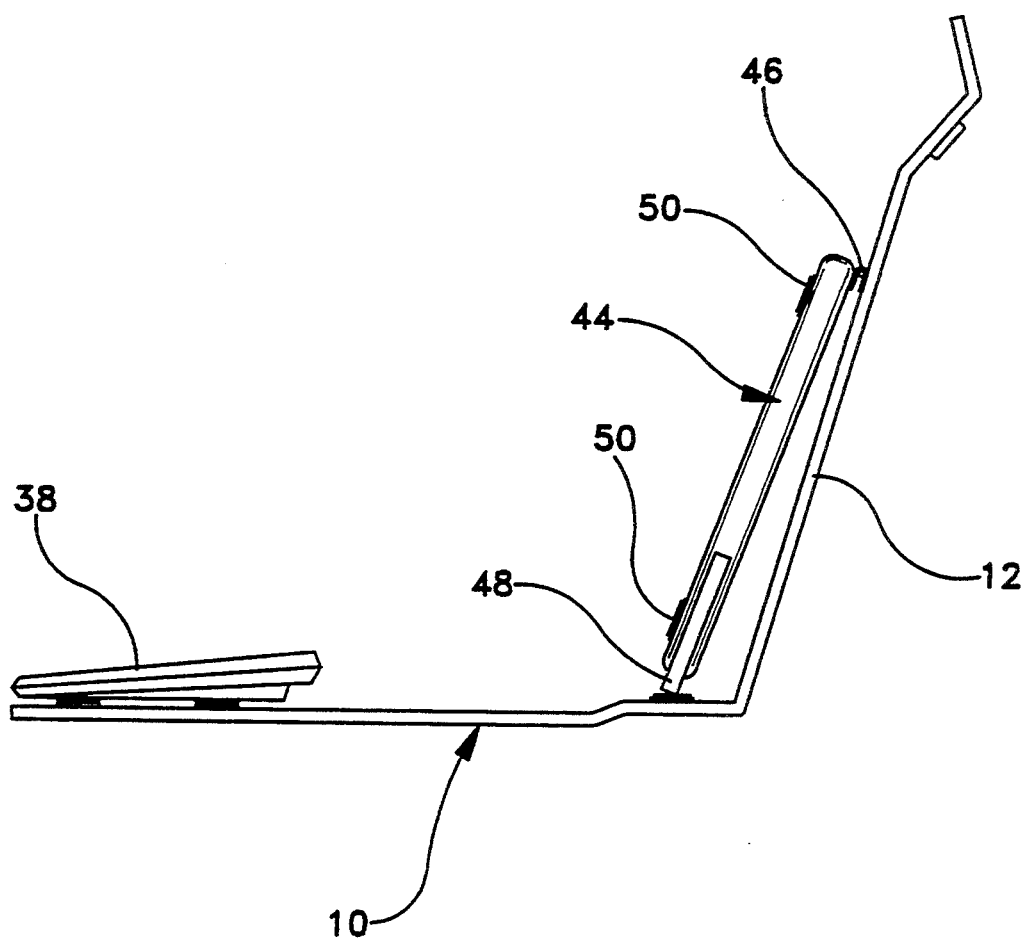
FIG. 5 is a side view of an alternative embodiment of the present invention in which a telescoping support shelf is employed.

In one preferred emobodiment, as shown in FIG. 5, case 10 may be provided with a substantially rigid shelf 44. Preferably, shelf 44 is permanately attached to back 12 by a hinge 46. In this fashion, shelf 44 may be stored flat against back 12 when not in use and rotated outward to create the triangular support structure during non hand-held use of the computer. To accomplish this task, shelf 44 is preferably provided with a telescoping leg 48 which is engagable with a fastening strip positioned on either the base or the front. Finally, the support shelf is provided with fastening strips 50 which releasably grasp the computer to allow viewing thereof.

Figure 6:
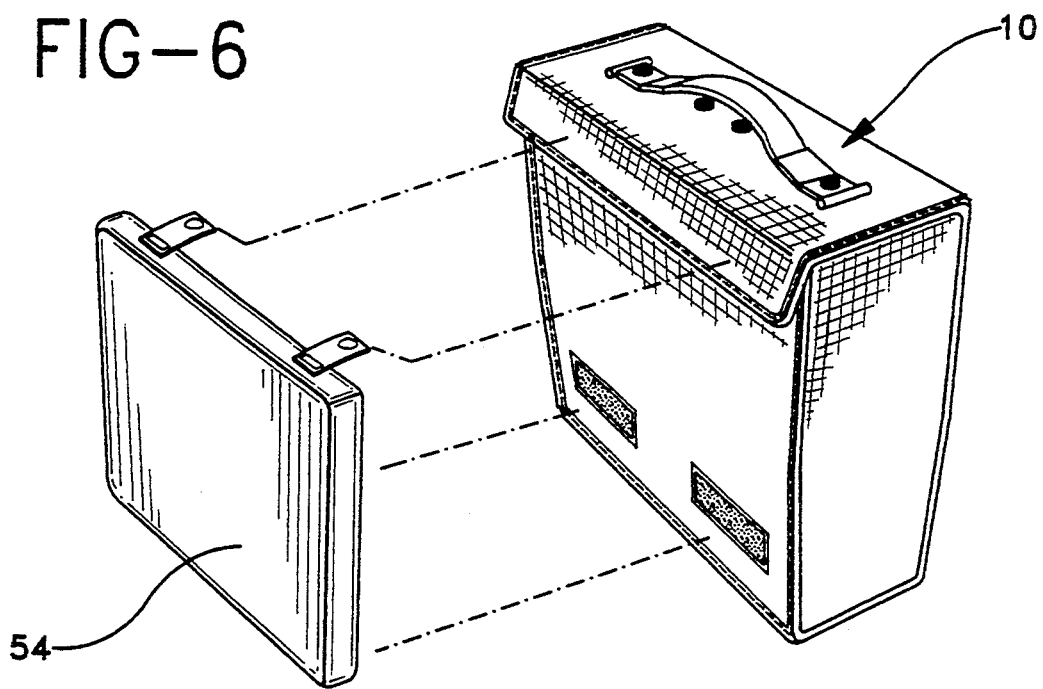
FIG. 6 is a front perspective view of the present invention depicting a detachable pocket exploded away from the front of the case.
Figure 7:
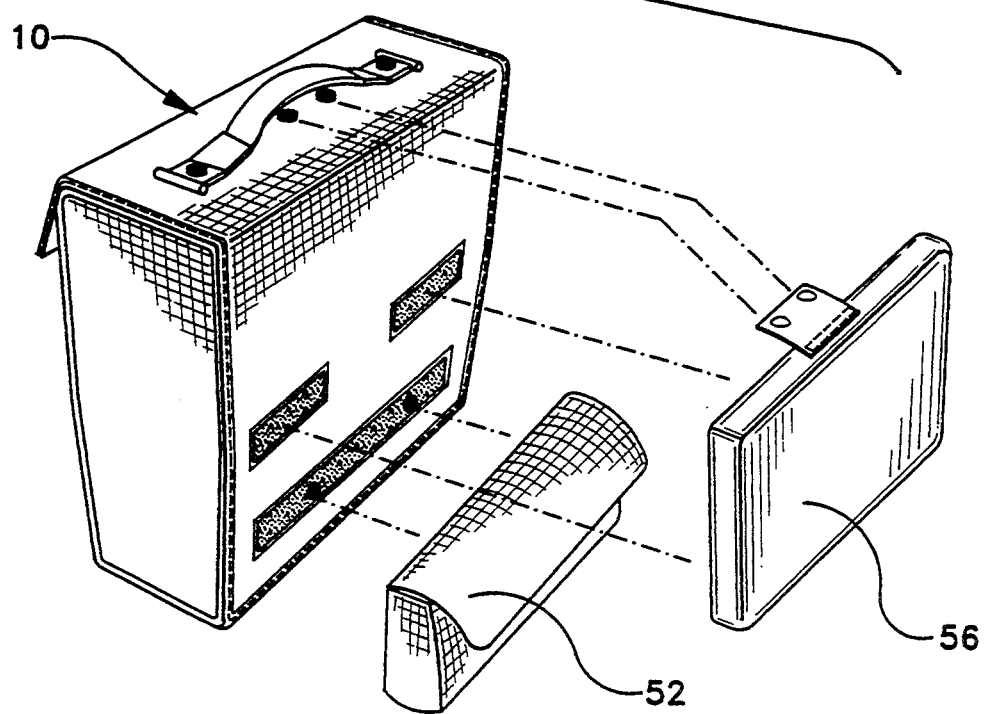
FIG. 7 is a rear perspective view of the present invention depicting detachable pocket and pouch exploded away from the back of the case.

Referring to FIGS. 6 and 7, the design of the present invention allows a plurality of pouches and/or pockets to be removably secured to the exterior surface of the front and back. These pouches and/or pockets may be secured to the case by, for example, hook and loop fasteners, snaps, clips, etc. In this fashion, the user of the system can determine which accessories need to be carried and, thereafter, readily remove and leave behind the unnecessary accessories.

For example, a salesman may decide that it is only necessary to carry pouch 52 (shown in FIG. 7) into the work place of the client. The salesman can then detach pockets 54 and 56 and leave such pockets in, for example, the salesman's automobile. Once in the work place, the salesman can detach pouch 52, open the carrying case and position the computer for viewing.

As mentioned, one type of computer readily adaptable for use with the present invention is the pen-based computer. Such a computer is often removed entirely from the case for manual use by the operator. This same computer may also be used with a keyboard, in which case the computer may be supported for viewing by the case.

Figure 8:
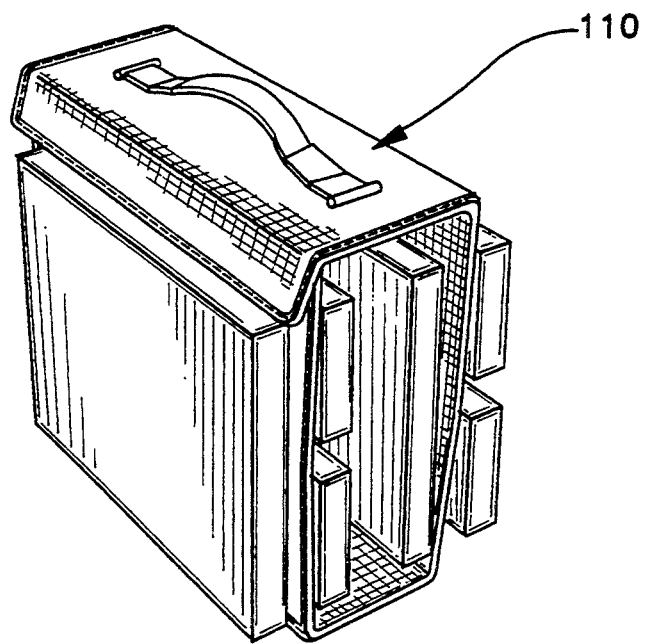
FIG. 8 is a perspective view of an alternative embodiment of the present invention.
Figure 9:
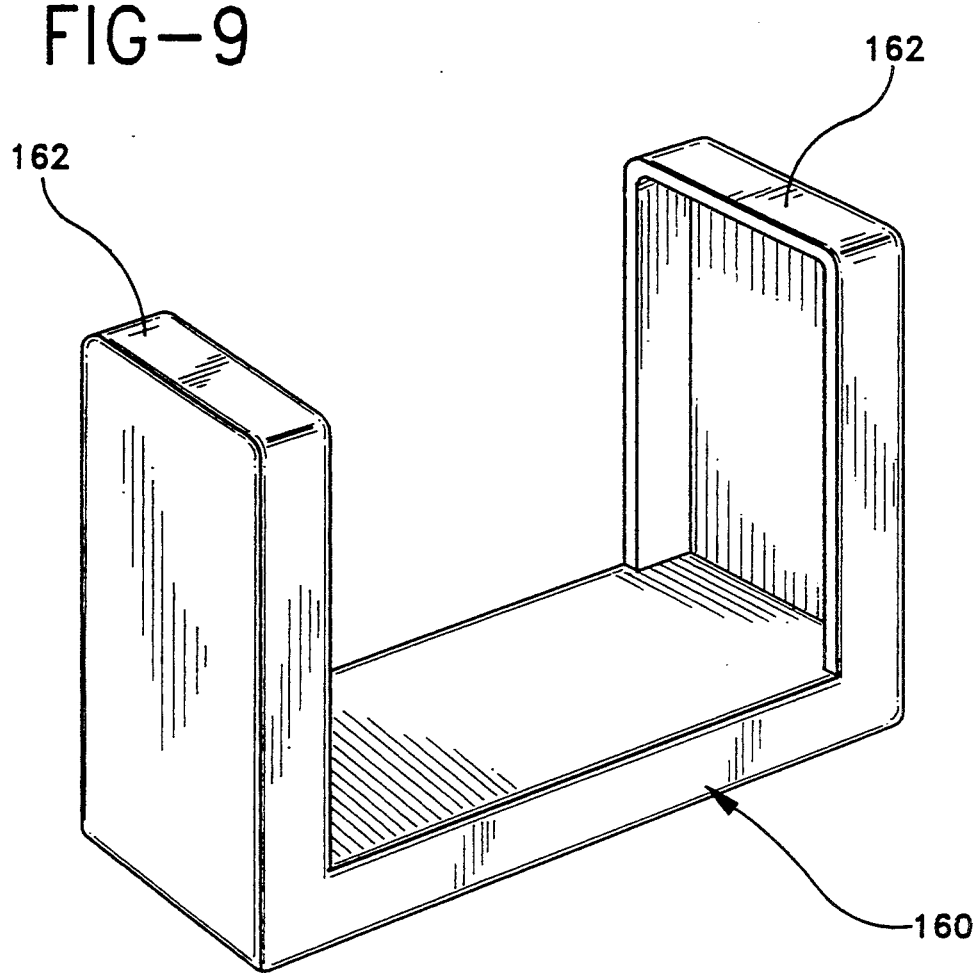
FIG. 9 is a perspective view of an enclosure boot sized to receive the case of FIG. 8.

In another preferred embodiment, the case (i.e., case 110 shown in FIG. 8) is fabricated without sides. Such a design may facilitate opening and closing of the case. However, because of the lack of sides, the computer components may be exposed to inclement environmental conditions. The computer may also be unintentionally banged or jostled. To alleviate these drawbacks, the embodiment illustrated in FIG. 8 may be designed to cooperate with a boot 160.

Particularly, during long periods of non-use or during periods of travel, case 110 is inserted into boot 160. The boot may be releasably secured to the case by, for example, elastic flaps 162. Of course, other means of securing the boot for the case are also contemplated.

The case, i.e., case 10 or 110, is preferably manufactured from a stiff material such as fiberboard. The fiberboard, in turn, may be covered with a suitable fabric such as nylon. Although the fiberboard itself provides protection to computer stored in the case, additional cushioning material may also be employed. For example, this cushioning material may be installed between the fiberboard and nylon covering.

Thus, while there have been described what are presently believed to be the preferred embodiments of the invention, those skilled in the art will realize that various changes and modifications may be made to the invention without departing from the spirit of the invention, and it is intended to claim all such changes and modifications which fall within the scope of the invention.

What is claimed is:

1. A carrying case for a portable computer, said carrying case providing ready access to said computer to allow hand-held use and also providing a variable-angle support stand for said computer during non hand-held use, comprising:

front, back and bottom portions, said bottom portion extending between and interconnecting said front and back portions, said portions articulable with respect to each other between a closed position and an open position;

first securing means positioned on one of said portions to releasably secure a first edge of a triangular support plane when said case is in said open position; and second securing means positioned on another of said portions to releasably secure a second edge of said support plane whereby said support plane and said case form a triangular support structure.

2. The case according to claim 1, wherein said support plane comprises a substantially rigid shelf movable between a stored position in which said shelf is rested against said back portion and a working position in which said shelf forms one leg of said triangular support structure.

3. The case according to claim 2, wherein said shelf includes third securing means for removably securing said computer thereto.

4. The case according to claim 2, wherein said shelf includes a telescoping leg whereby the length of said shelf is variable between a minimum length in which said leg is entirely retracted and a maximum length in which said leg is entirely extended.

5. The case according to claim 1, wherein said support plane comprises said computer.

6. The case according to claim 5, wherein said computer includes a lower edge and an upper edge, and wherein said lower and upper edges are configured to engage said first and second securing means respectively whereby said computer forms one leg of said triangular support structure.

7. The case according to claim 1, wherein said portions define a substantially rectangular enclosure sized to accommodate said computer when said case is in said closed position.

8. The case according to claim 7, furthering comprising a top portion hingedly attached to one of said back and front portion and sized to cover said enclosure.

9. The case according to claim 8, wherein one side of said top portion is hingedly attached to said back portion and the other side of said top portion includes closure means for engagement with said front portion.

10. The case according to claim 8, further comprising a handle secured to said top portion to facilitate handling of said case.

11. The case according to claim 1, wherein said front portion is hingedly attached to said bottom portion to allow rotation of said front portion from said closed position to said open position in which said front portion is substantially co-linear with said bottom portion.

12. The case according to claim 1, wherein said back portion has a length and a width, said width running along the edge of said back portion adjoining said bottom portion and said length running perpendicular thereto, and wherein said second securing means extends along said length of said back portion allowing said upper edge of said support plane to be secured at a plurality of locations along said second securing means whereby said support plane may be positioned at varying angles to facilitate viewing thereof.

13. The case according to claim 12, wherein said second securing means comprises a pair of fastening strips running along said length of said back portion.

14. The case according to claim 1, wherein said bottom portion has a length and a width, said width running along the edge of said bottom portion adjoining said back portion and said length running perpendicular thereto; and wherein said first securing means extends across said width of said bottom portion.

15. The case according to claim 14, wherein said first securing means comprises at least one fastening strip.

16. The case according to claim 1, wherein said front portion has a length and a width, said width running along the edge of said front portion adjoining said back portion and said length running perpendicular thereto; and wherein said first securing means extends across said width of said front portion.

17. The case according to claim 16, wherein said first securing means comprises at least one fastening strip.

18. The case according to claim 1, further comprising third securing means positioned on said front portion to releasably grasp an electronic component.

19. The case according to claim 18, wherein said component comprises a keyboard which may be operatively connected to said computer.

20. The case according to claim 18, wherein said front portion has a length and a width, said width running along the edge of said front portion adjoining said bottom portion and said length running perpendicular thereto; and wherein said third securing means comprises at least one fastening strip extending across the width of said front portion.

21. The case according to claim 1, further comprising an enclosure boot sized to receive said case when said case is in said closed position whereby the exposed side regions of said case are enclosed.

22. The case according to claim 21, wherein said boot includes elastic flaps for releasably attaching said boot to said case.

23. The case according to claim 1, further comprising a pair of side portions hingedly attached on one side to one of said back and front portions; and wherein the other side of said side portions includes closure means for engagement with the other of said back and front portions.

24. The case according to claim 1, further comprising attachment means positioned on the exterior surfaces of said case to allow a plurality of carrying pockets to be attached to said case.

25. The case according to claim 24, wherein said attachment means comprises one of snaps, velcro, buckles.

* * * * *